United States Patent Office 3,439,246
Patented Apr. 15, 1969

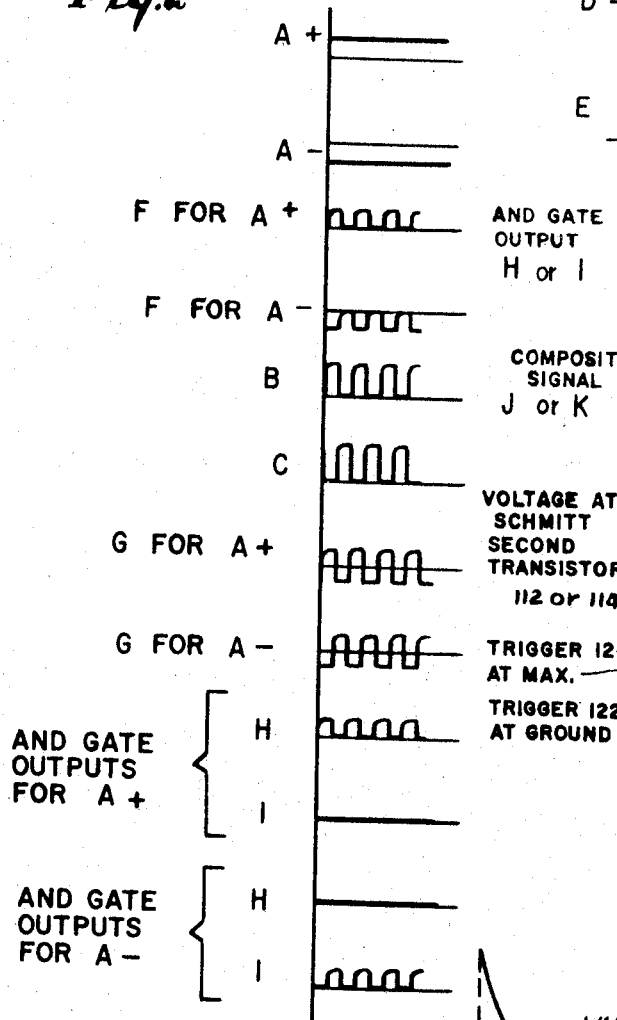
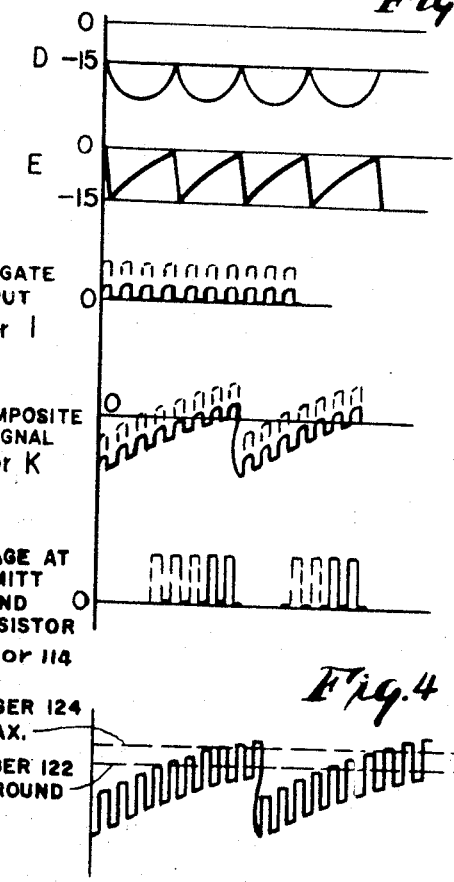
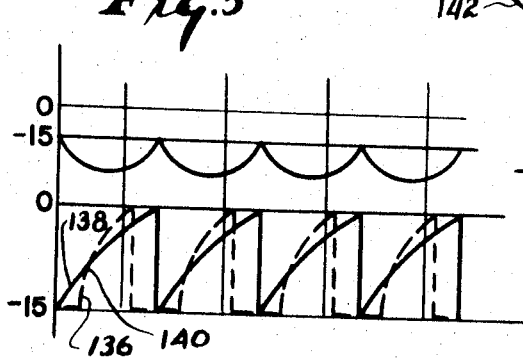
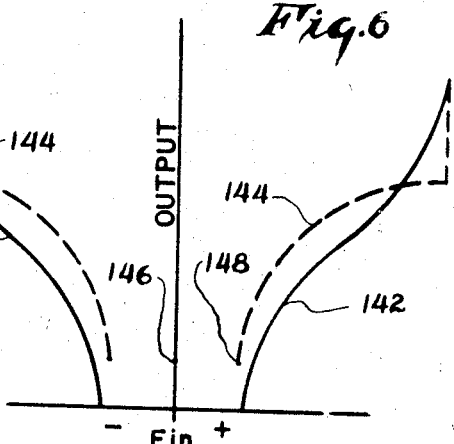

3,439,246
BI-DIRECTIONAL PROPORTIONAL SERVO MOTOR CONTROL SYSTEM
Frederick G. Moritz, Hauppauge, N.Y., assignor to Potter Instrument Company, Inc., Plainview, N.Y., a corporation of New York
Original application Aug. 14, 1963, Ser. No. 302,174, now Patent No. 3,308,307, dated Mar. 7, 1967. Divided and this application Dec. 29, 1966, Ser. No. 605,774
Int. Cl. H02p 1/22
U.S. Cl. 318—257        7 Claims

ABSTRACT OF THE DISCLOSURE

The specification and drawings disclose a bi-directional proportional servo motor control system in which silicon control rectifiers (SCR's) are used to energize a servo motor with a pulsating D.C. potential. The firing angle of the SCR's is controlled by a high-frequency pulse whose amplitude is proportional to the error signal and which is superimposed upon a sawtooth waveform to provide a time base.

---

This application is a division of copending application Ser. No. 302,174, entitled "Servo Amplifier," filed Aug. 14, 1963, now Patent No. 3,308,307 issued Mar. 7, 1967.

This invention relates to a servo system and, more specifically, to a servo system in which the firing of gated rectifiers are controlled in response to an input error signal in which the amplitude of the input error signal is proportional to the error and in which the polarity of the input error signal is indicative of the direction of the error.

Servo amplifiers, to provide an output signal the effective direction of which, such as phase or polarity, is responsive to the polarity of the input signal and the effective amplitude of which is responsive to the amplitude of the input signal, are known in several forms.

For example, DC amplifiers have been used. However, such amplifiers suffer from problems of drift and stability. Control of the conduction angles of gated rectifiers, particularly the gated silicon controlled rectifiers employed in recent years, has been accomplished by AC magnetic servo amplifiers. However, magnetic servo amplifiers used to control conduction angles suffer from the drawback that control is delayed by a half cycle of the line frequency.

It is, therefore, the primary object of the present invention to provide a stable, fast acting servo system in which signals are generated suitable for the control of the conduction angle of alternate gated rectifiers in response to an input error signal of variable amplitude and reversible polarity.

In accordance with this object, there is provided, in a preferred embodiment of this invention, a servo amplifier having an input terminal and having first and second output terminals which may be coupled to the gate electrodes of gated rectifiers for control of the firing thereof. The first or second output terminal is energized in response to the polarity of the input signal and the time of energizing each output terminal with a gate firing pulse, is dependent upon the amplitude of the input signal thereby to control the conduction angle of the gate controlled rectifiers.

The servo amplifier comprises an astable multivibrator free running at a high frequency with respect to the line frequency and a modulator such as a ring modulator. The input signal is applied to the ring modulator and modulated by the multivibrator square wave. The modulated output of the ring modulator will, therefore, comprise a square wave, the amplitude of which is directly related to the amplitude of the input wave and the phase of which is directly related to the polarity of the input signal.

The modulated signal from the ring modulator is amplified and applied simultaneously to a first and second AND gate. The other input to the first AND gate is derived from the first stage of the astable multivibrator. The other input to the second AND gate is derived from the second stage of the multivibrator. Since the modulated input signal is keyed or phased-locked to the multivibrator outputs, the modulated signal will be in phase with the signal from one stage of the multivibrator and 180° out of phase with the other. The inphase relationship will change as the polarity of the input reverses. The AND gate will pass a square wave of the modulated input signal (being the smaller of the two signals applied to the AND gate).

A wave-shape generator as, for example, a sawtooth generator is provided to generate a wave shape of increasing amplitude with time throughout each half cycle of the line frequency. The sawtooth from the generator is applied to the base electrodes of the first transistor of both a first and second Schmitt trigger (also termed a squaring circuit, or a bistable multivibrator having regenerative feedback for faster switching). Simultaneously, the output of the first AND gate is applied to the base of the first Schmitt trigger and the output of the second AND gate is applied to the base of the second Schmitt trigger. Since only one gate will pass a signal, the input to one trigger will comprise the sawtooth alone. The other trigger input will comprise a composite of the sawtooth and the modulated input signal passed by the AND gate. The sawtooth waveform is controlled so that it will not reach the threshold voltage to trigger the Schmitt circuit. However, the composite waveform of the sawtooth and the modulated input will reach the triggering voltage of the Schmitt trigger. Since the sawtooth is constant, the phase delay to reach the threshold or triggering potential by the composite wave will depend on the amplitude of the modulated signal. When the combined amplitude of the composite signal reaches the triggering potential of the Schmitt trigger, it will fire. The output of the Schmitt trigger will, therefore, consist of a plurality of square waves of fixed amplitude, the initiation time of which is determined by the time taken to reach the triggering potential. Emitter followers are used to couple the outputs of the first and second Schmitt trigger circuits to the gate electrodes of the first and second gated rectifiers respectively. Thus, when the Schmitt trigger circuit operates, the gated rectifier will be driven into the conductive state, and, of course, will conduct throughout the remainder of the half cycle. Removal of the gate electrode potential and the reduction of the anode potential to zero will return conduction control to the gate electrode. The gated rectifiers are serially coupled with the forward and reverse servo motor windings to control direction of and torque of motor drive in conventional manner.

The dead band of the circuit may be adjusted by coupling the emitter electrodes of the first transistor of said first and second trigger circuits to a source of potential of variable amplitude. In this manner, the dead band may be simply and easily adjusted. Also, gain variation as a function of the amplitude of the input signal is often desirable, which is provided in the present circuit merely by selection of the wave shape provided by the waveform generator. Such control of gain characteristics as a function of the input signal amplitude is simply achieved in the present circuit although it is very difficult to achieve in many of the circuits known to the prior art.

Having briefly described this invention, it will be described in greater detail along with other objects and advantages thereof in the following detailed description, which may best be understood by reference to the accompanying drawings, of which:

FIG. 2 is a plot of the amplitude of the signals appearing in various portions of the circuitry shown in FIG. 1 along a common time scale;

FIG. 3 is a plot of the waveform of the individual waveform generated in the circuit of FIG. 1 and the composite signal as the waveforms are added, taken at the indicated points of the circuit shown in FIG. 1;

FIG. 4 is a plot of the composite signal applied to one of the trigger circuits used in FIG. 1, illustrating the variation in the dead-band of the circuit;

FIG. 5 is a plot of the wave shape generator for different modes of operation to illustrate the change of the response with input signal amplitude; and FIG. 6 is a plot of the response of the overall amplifier by plotting conduction angles as a function of input signal amplitude.

Figure 1:
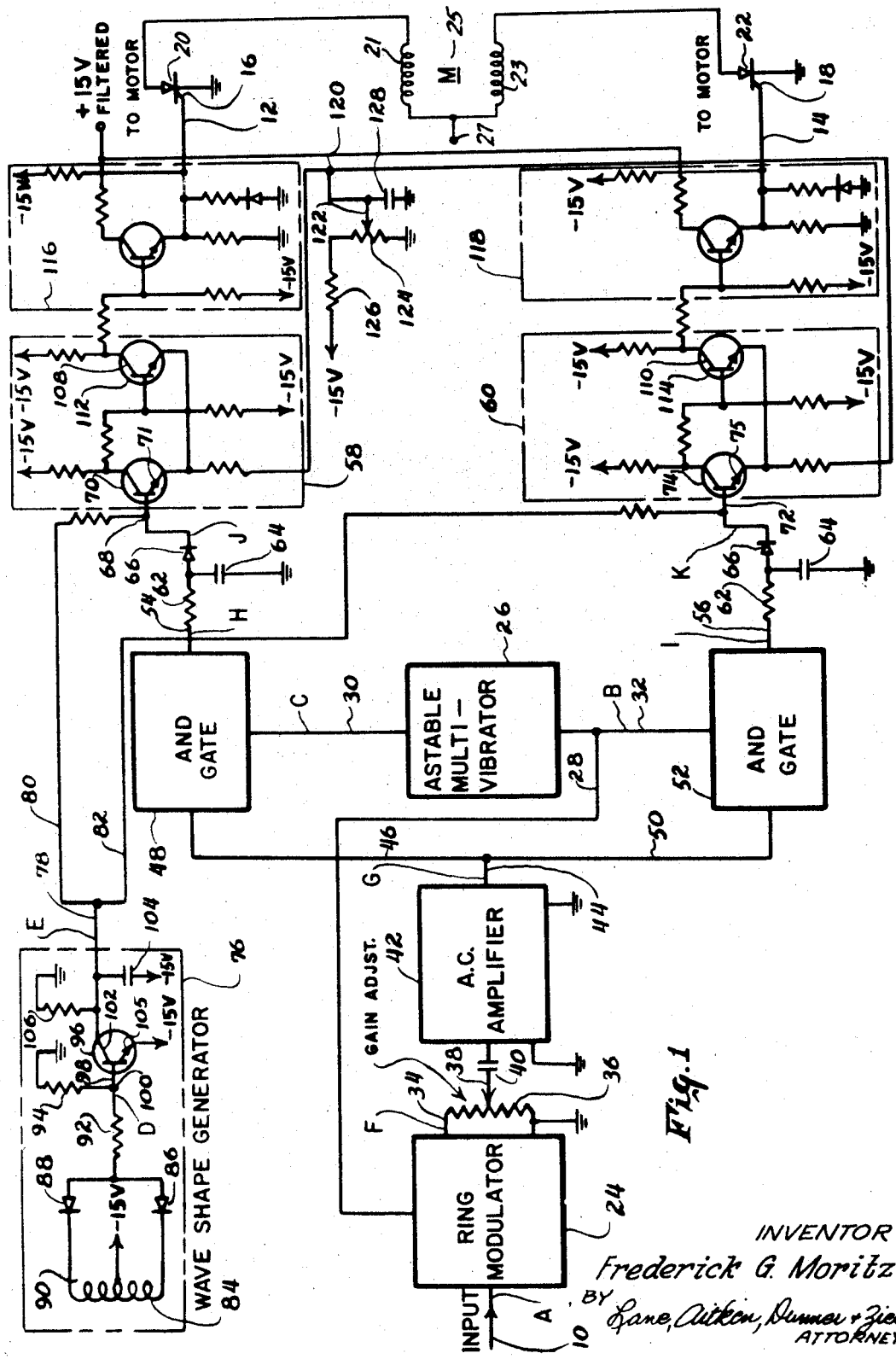
FIG. 1 is a schematic diagram of a servo system in accordance with the present invention.

In FIG. 1, there is shown a servo system having an input lead 10 and a first and second output lead 12 and 14 respectively, which outputs are coupled to the gate electrodes 16 and 18 of a first and second gated rectifier 20 and 22 respectively. The gated rectifiers (which preferably are SCR's or silicon controlled rectifiers) may be respectively serially coupled with a forward motor winding 21 and reverse motor winding 23 of a motor 25 and a source of full wave rectified alternating voltage applied at terminal 27 in a conventional fashion. Thus, as the respective rectifiers fire, the current will flow through the respective controlled winding to drive the servo motor in the desired direction. The current flow through the motor winding and thus the accelerating motor torque developed will be determined by the time of firing of the gated rectifier with respect to the half cycle of current applied therethrough.

The input signal is applied to a ring modulator 24 which modulates the input signal by the signal applied thereto from the astable multivibrator 26 over lead 28.

The astable multivibrator is conventional in construction and comprises a free-running multivibrator operating at a frequency much higher than the line frequency. For example, multivibrator operation to generate a square wave output with a frequency of approximately 3 kc. is satisfactory. The output from the multivibrator on leads 30 and 32 will be 180° out of phase as will be seen by inspection of the waveforms in FIG. 2 illustrating the wave shapes at B and C respectively.

The ring modulator will modulate the input signal A (FIG. 2) by the square wave signal applied thereto to generate an output signal, the amplitude of which is equal to the amplitude of the input signal and the phase of which is related to the polarity of the input signal as is shown at F in FIG. 2 for both polarity states of the input signal. The output from the modulator 24 is applied over lead 34 to a potentiometer 36, the tap 38 of which couples the desired proportion of the signal through coupling capacitor 40 to an AC amplifier 42.

The coupling capacitor 40 serves to eliminate the DC component in the waveform shown at F. Thus, after amplification by a conventional AC amplifier 42, the output waveform at G on lead 44 consists of a square wave signal having an amplitude relating to the input signal and a phase relationship related to the polarity of the input signal as is shown for both polarity states of the input as G of FIG. 2. This output signal is applied over lead 44 and 46 to a first AND gate 48 and over leads 44 and 50 to a second AND gate 52. The AND gates also receive an input signal from the respective stages of the astable multivibrator which are of equal amplitude but opposite in phase. The AND gates will pass a signal only when the input signals applied thereto are coincident in phase. Similarly, when the input signals are noncoincident, the AND gate will not pass an output signal. Since the modulated input signal applied to the gates are keyed on phase-locked to the multivibrator, the modulated input signal will always be in phase with one stage of the multivibrator input and 180° out of phase with the other stage of the multivibrator. Thus, AND gate 48 will pass a signal with one polarity of the input signal and the AND gate 52 will pass a signal with the opposite polarity of the input signal. Thus, as is shown as waveform H and I in FIG. 2, the AND gate 48 will pass a signal when the input polarity is positive and gate 52 will pass no signal. Similarly, if the input polarity is negative, also illustrated in FIG. 2, the AND gate 52 will generate an output signal illustrated at I and gate 48 will pass no signal.

Thus, the circuit distinguishes between the polarity of input signals and provides an output signal on either lead 54 or lead 56 dependent upon input polarity, which signal has amplitude directly proportional to the amplitude of the input signal. The relationship between the amplitude of the signals on leads 54 and 56 to the amplitude of the input signal can be controlled by the tap position 38 on the potentiometer which is a conventional way of adjusting amplifier gain.

In order to utilize the signal amplitude for control of the time of firing of the SCR, a first and second Schmitt trigger circuit 58 and 60 (also referred to as a squaring circuit or a squaring bistable multivibrator) is provided. The signal from lead 54 is coupled through a low-pass filter network comprising a resistor 62, capacitor 64 and diode 66 to the base electrode 68 of the input transistor 70 of the Schmitt trigger 58. Similarly, the signal on lead 56 is coupled through an identical low-pass filter to the base electrode 72 of the first transistor 74 of the Schmitt trigger 60. A waveform generator 76 is provided and the output signal therefrom is coupled through leads 78 and 80 to base 68 of transistor 70 and through leads 78 and 82 to the base 72 of transistor 74. The wave shape generator 76 is preferably the sawtooth oscillator schematically illustrated.

The center tap 12 volt AC-60 cycle winding 84 and diodes 86 and 88 form a full wave rectifier referenced to the −15 volts, to which the transformer center tap 90 is connected. This supply voltage together with the divider circuit formed by resistors 92 and 94 determine the point at which transistor 96 will fire since the base electrode 98 thereof is coupled to the junction 100 between resistors 92 and 94. Thus, as can be seen by reference to the waveform at point D shown in FIG. 2, it can be seen that once during each half cycle, the voltage at the junction will rise to zero enabling transistor 96 to conduct. When the transistor conducts, the collector electrode 102 will go to −15 volts, as determined by the supply coupled to the emitter electrode 105. During such conduction, any charge in capacitor 104 is drained off. When the transistor again is turned off, capacitor 104 starts to charge through resistor 106. Thus, the waveform, at point E illustrated in FIG. 2 is a sawtooth waveform, the slope of which is determined by the time constant of the circuit containing capacitor 104 and resistor 106.

Since the output of the generator 76 is coupled to the input of the Schmitt triggers and since the amplified and modulated input voltage is also applied to the same electrode, the operation of the Schmitt trigger will be determined by the composite waveform. This is best seen by reference to FIG. 3 which shows the sawtooth waveform, the square wave, the composite wave applied to the input transistor of the Schmitt trigger and the output second stage output derived at the collector electrodes 108 and 110 of the respective second transistors 112 and 114 of the trigger circuits.

As can be seen, the composite signal is a stepping signal having a plurality of square wave pulses superimposed on the rising sawtooth waveform. When this composite signal reaches the firing potential or "threshold voltage" of the Schmitt trigger, it will fire the circuit generating an output signal illustrated in FIG. 3 of predetermined amplitude. However, the time to reach the threshold with respect to a half cycle of the line frequency is determined both by the time during which the sawtooth voltage has been allowed to increase and by the amplitude of the superimposed square wave thereon. Thus, phase control by input signal amplitude is provided. The output signal of the trigger circuit 58 is coupled to the gate electrode 12 of the controlled rectifier 20 by an emitter follower 116. Similarly, the output of the trigger 60 is coupled to the gate electrode 18 of the controlled rectifier 22 by an emitter follower 118. The output of the trigger circuits comprise a plurality of pulses. The first pulse turns the associated SCR on and the subsequent pulses have no effect since the gate loses control for the remainder of the cycle. However, the pulses do not harm and are not eliminated.

In order to ensure stability of servo circuits, it is necessary to provide means for adjusting the dead band of the amplifier, which is provided in the present amplifier by coupling the emitter electrodes 71 and 75 of transistor 70 and 74 respectively to a source of variable potential at terminal 120. The potential at terminal 120 is selected by the position of tap 122 of potentiometer 124 which potentiometer is serially coupled with resistor 126 between ground and —15 volt supply. A bypass capacitor 128 is coupled across the potentiometer 124. The operation of the adjustment of the bypass may best be understood by reference to FIG. 4 which shows the composite waveform 130 plotted with the triggering levels when the resistor 124 is at its maximum as shown by line 132 and when the tap 122 is at ground potential as represented by line 134. Thus, it can be seen that the triggering level of both trigger circuits 58 and 60 can be simultaneously and simply adjusted thereby to control the dead band of the circuit.

Similarly, it is oftentimes desirable to provide an amplifier gain which varies with the amplitude of the input signal. In such applications, the waveform from the generator 76 may be modified merely by adjustment of the resistance values of resistors 92 and 94 to drive transistor 96 into a conductive state over a longer portion of the total cycle. In such cases, as is illustrated in FIG. 5, the waveform provided will follow the outline represented by the curve 136 as contrasted with the regular linear sawtooth of curve 138. When the waveform 136 is applied to the trigger circuit in combination with the square wave superimposed thereon, the modified sawtooth 136 will provide an immediate jump to a finite output as the input is increased above zero and then will have an increasing output as a function of input until point 140 is reached along the waveform. Thereafter, the modified sawtooth will produce a lower gain of output as a function of increase in input than would the linear sawtooth. This characteristic of the gain of the amplifier is shown in FIG. 6 which is a plot of the output in terms of conduction angle of the controlled SCR as a function of input. Curve 142 is the gain characteristic of the amplifier utilizing a linear sawtooth and the curve 144 is a plot using the modified sawtooth. It will be noted that other waveforms can be utilized to give desired response characteristics. It is also important to note that when using the modified sawtooth waveform, an output signal would be provided with zero input due to the noise in the circuit. Thus, the curve for the modified output would start at point 146. This would obviously lead to serve circuit instability, but can be overcome by adjustment of the dead band by the positioning of tap 122 on the potentiometer 124, which would move the starting point of curve 144 to point 148.

Thus, in this manner, the desired response characteristics can be had in a stable circuit configuration.

This invention may be variously modified and embodied within the scope of the subjoined claims.

What is claimed is:

1. A servo system comprising a motor operable to move in one direction in response to being energized in a first manner and operable to move in the opposite direction in response to being energized in a second manner, a source of error signal, means responsive to said error signal having a first polarity to produce a first composite waveform having a generally sawtooth shape of a first frequency with pulses at a second higher frequency modulating the amplitude of the sawtooth shape and responsive to the error signal having the opposite polarity to produce a second composite waveform having generally a sawtooth shape of said first frequency with pulses at said second higher frequency modulating the amplitude on the sawtooth shape, the amplitude of the pulses modulating said sawtooth waveform varying in accordance with the amplitude of said error signal, first energizing means responsive to said first composite waveform to apply pulses to said motor to energize said motor in said first manner, said first energizing means including means to vary the length of the pulses applied to said motor by said first energizing means relative to the intervals between the pulses in accordance with when said first composite waveform reaches a predetermined amplitude and second energizing means responsive to said second composite waveform to apply pulses to said motor to energize said motor in said second manner said second energizing means including means to vary the length of the pulses applied to said motor by said second energizing means relative to the intervals between the pulses in accordance with which said second composite waveform reaches a predetermined amplitude.

2. A servo system as recited in claim 1 wherein said first energizing means comprises a first gated electronic valve of the type which fires and becomes fully conductive upon receiving a gating signal and which is connected to energize said motor when conductive and means to apply a gating signal to said gated electronic valve when said first composite waveform reaches its predetermined amplitude, and wherein said second energizing means comprises a second gated electronic valve of the type which fires and becomes fully conductive upon receiving a gating signal and which is connected to energize said motor when conductive and means to apply a gating signal to said second gated electronic valve in response to said second composite waveform reaching its predetermined amplitude.

3. A servo system as recited in claim 2 wherein said means to apply gating signals to said first and second gated electronic valves comprise bistable trigger circuits.

4. A servo system as recited in claim 1 wherein said first energizing means comprises means to initiate a pulse to be applied to said motor each time said first composite waveform reaches its predetermined amplitude and second energizing means comprises means to initiate a pulse to be applied to said motor each time said second composite waveform reaches its predetermined amplitude.

5. A motor control system comprising a motor, a source of error signal, means responsive to said error signal to produce a composite waveform having a generally sawtooth shape at a first frequency with pulses at a second higher frequency modulating the amplitude of said sawtooth shape, the amplitude of the pulses modulating said sawtooth shape varying in accordance with said error signal, and energizing means responsive to said composite waveform to apply pulses to said motor to energize said motor, said energizing means including means to vary the length of said pulses relative to the interval between said pulses in accordance with when said composite waveform reaches a predetermined amplitude.

6. A motor control system as recited in claim 5 wherein said energizing means comprises means to initiate a pulse to be applied to said motor each time said composite waveform reaches said predetermined amplitude.

7. A servo system as recited in claim 5 wherein said energizing means includes a gated electronic valve of the type which is fired and becomes fully conductive upon receiving a gating signal and which is connected to energize said motor upon being made conductive and means to fire said electronic valve upon said composite waveform reaching said predetermined amplitude.

References Cited

UNITED STATES PATENTS

| | | | |
|---|---|---|---|
| 2,495,726 | 1/1950 | Houghton et al. | 328—39 |
| 3,105,179 | 9/1963 | Young | 318—319 XR |
| 3,181,046 | 4/1965 | Sutton | 318—257 X |

B. DOBECK, *Primary Examiner.*

K. L. CROSSON, *Assistant Examiner.*

U.S. Cl. X.R.

318—297, 341